July 28, 1953 A. POLIANSKY 2,646,720
SUNBEAM RECEIVING AND REFLECTING DEVICE
Filed March 31, 1951

INVENTOR.
Alejandro Poliansky
BY

Patented July 28, 1953

2,646,720

UNITED STATES PATENT OFFICE 2,646,720

SUNBEAM RECEIVING AND REFLECTING DEVICE

Alejandro Poliansky, Buenos Aires, Argentina

Application March 31, 1951, Serial No. 218,586
In Argentina March 12, 1951

6 Claims. (Cl. 88—25)

My present invention relates to certain new and useful improvements in systems for the utilization of the solar energy for illumination and heating purposes in general.

The invention is based on known optical principles of the reflection of light rays by polished surfaces. The problem of efficiently and practically utilizing the solar energy resides in the constant change of position of the sun with regard to the earth due to the motion of the latter around the sun and around its own axis. The solution of this problem constitutes the main object of my present invention and comprises the provision of an improved means which permit a practical utilization of the solar energy for the purposes referred to in a very simple and economical manner with good results.

With regard to the solution of the afore-mentioned problem, it appears to be convenient to give the following explanations. As is well known, the earth is moving around the sun on the ecliptic and makes a complete revolution within a period of one year and simultaneously rotates around its axis within 24 hours. The axis of the earth in the space is inclined under an angle of 23°27′ with regard to the perpendicular to the plane of the ecliptic. Looking from the earth, it may be seen that the sun moves along the ecliptic and during one year its altitude above the horizon at noon is subject to variations of ±23°27′ from its middle position corresponding to the days of equinox i. e. the 22nd of March and the 22nd of September. At these days the sun describes on the heavens with relation to the horizon an angle of 180° (without keeping in mind the atmospheric refractions); its altitude above the horizon at noon is the middle altitude and is equal to the difference between 90° and the latitude of the place under consideration. For instance, the latitude of Buenos Aires being of 34°36′, the altitude of the sun at noon at the days of equinox is $$90° - 34°36' = 55°24'$$

If from the day of equinox the sun increases its altitude above the horizon, the time of daylight of each day becomes longer as the sun describes on the heavens from horizon to horizon an angle of more than 180°. At the day with the longest daylight time, the summer solstice, the sun at noon reaches its maximum altitude above the horizon i. e. of $90° - \varphi + 23°27'$, for Buenos Aires, $90° - 34°36' + 23°27' = 78°51'$. If, on the contrary, from a day of equinox, the sun starts diminishing its altitude above the horizon at noon, the sun describes above the horizon angles smaller than 180°, the time of daylight of each day becomes shorter and at the day with the shortest daylight time, winter solstice, the minimum altitude of the sun at noon is $90° - \varphi - 23°27'$, for Buenos Aires: $90° - 34°36' - 23°27' = 31°57'$. These variations of the altitude of the sun above the horizon are valid for the latitudes between 23°27′ and 66°33′ (for the torrid and polar latitudes the changes of the position of the sun are the same, but with different effects). The whole of the changes of the altitude of the sun above the horizon is subject to constant variations. These variations corresponding to horary variations are indicated by angles, the maximum value corresponding to the days of equinox, specially to the 22nd of March, at which said variation amounts to 59.29″, whereas at the days of solstice its value is zero.

The main object of the invention is to provide an improved rotative and adjustable primary sunbeam-receiving and reflecting device which is so arranged and constructed as to efficiently render the utilization of the solar energy economical and practical for illumination and heating purposes in general despite the constant change of the direction of incidence of the sunbeams. In as far as the horary variations above referred to are concerned, the same may be disregarded if the distance over which the sunbeams are reflected by the said primary reflector is relatively small and in exceptional cases of larger distances, the afore-mentioned horary variations may be readily taken into consideration by increasing the surface areas of secondary reflector means with said primary reflector, because at a distance of e. g. 100 m., for the variation of 59.29″, the deviation of the rays reflected by said primary reflector will be of but 3 cm. per hour i. e. during ten hours of daylight, said deviation will be of 30 cm. altogether.

Keeping in mind that the afore-mentioned distance of 100 m. practically constitutes a maximum and that the same will be generally smaller for the purposes of this invention and that at smaller distances the said deviation will also be correspondingly smaller, it will be readily understood that the proposed increase of the surface area of the secondary reflector means to be used in connection with the sunbeam-receiving and reflecting device according to the invention is perfectly feasible.

In accordance with the preceding statements, one object of the invention consists in providing a primary sunbeam-receiving and reflecting device so arranged that it reflects the sunbeams in the direction of its axis of rotation and that the latter is substantially parallel to the axis of the earth, said device including mechanical adjustment means for changing once per day the inclination of said axis of rotation according to the angle of the respective position of the sun with regard to the ecliptic and for continuously changing the position of said primary reflector with regard to the sun; and at least one secondary reflector means arranged for co-operation with said primary reflector and for re-reflecting the sunbeams.

The material advantages obtained by the present invention are, as will be readily appreciated, of very great importance. If one keeps in mind that millions of electric lamps are lighted the whole day long for lack of daylight, it will be perfectly understood that from the economical point of view the present invention solves a problem of vital importance.

With these objects and advantageous features in view, the present invention will now be described in detail with particular reference to the accompanying drawings showing by way of examples only a preferred embodiment of the primary sunbeam-receiving and reflecting device and its application in combination with secondary reflector means for illumination and heating purposes. On said drawings.

Figure 5:
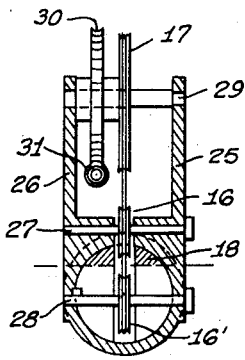
Figure 4:
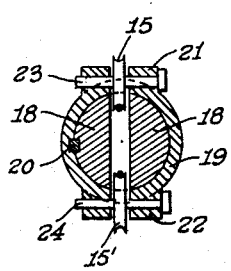
Figure 1:
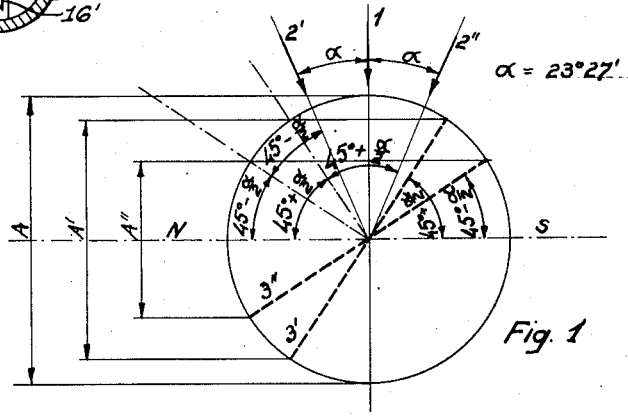
Figure 1 is a schematic view illustrating the principle of reflection which constitutes the basis for the operation of the primary sunbeam-receiving and reflecting device according to the invention.
Figures 2, 3:
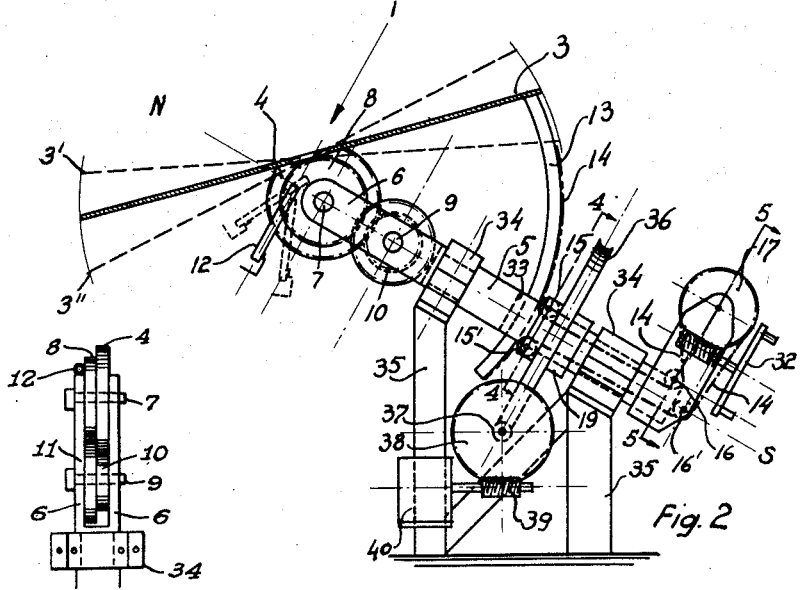
Figure 2 is a side elevation of the primary sunbeam-receiving and reflecting device according to a preferred embodiment of the invention.

Figure 3 is a detail plan view of a part of the device according to Figure 2; and Figures 4 and 5 are sectional views taken along the lines 4—4 and 5—5, respectively, of Figure 2;

Having reference to the accompanying drawings, Figure 1 illustrates the principle of reflection for the arrangement and operation of the primary sunbeam-receiving and reflecting device with relation to the variation during one year of the altitude of the sun above the horizon, in such a manner that the rays are always reflected in the same direction.

As has been explained, the horary variations, the maximum value of which is of 59.29'', generally need not be taken into account. Consequently it is sufficient to consider the change of the direction of the sunbeams caused by the rotation of the earth around its axis. For this reason, according to the invention, for the purpose of responding to this change of the direction of the sunbeams, the sunbeam-receiving and reflecting device is rotative around an axis N—S (Fig. 1) parallel to the axis of the earth. At the days of equinox when the direction of the sunbeams is perpendicular to the axis of the earth, the reflecting surface of the device must be arranged at an angle of 45° to the direction of the sunbeams. This direction of the sunbeams at the days of equinox has been indicated at I, whereas the direction at the days of solstice is shown by the lines 2' and 2'', the inclination of which with regard to the direction I is $\alpha$—23°27'. In order to have the sunbeams reflected in the direction of the axis N—S, the reflecting surface 3 has to be arranged in such a manner that, in view of the angle of incidence being equal to the angle of reflection, as shown in Figure 1 for the sunbeam 2', the reflecting surface takes the position 3' or that, for the same sunbeam 2', the sum of the angles of incidence and reflection is equal to sum of 90°+$\alpha$ or that any of the said angles is equal to the sum of $$45°+\frac{\alpha}{2}$$

For the sunbeam 2'' the position of the reflecting surface will be that indicated at 3'' and the angles of incidence and reflection will be each $$45°-\frac{\alpha}{2}$$

It is evident that at the days of equinox the reflecting surface is so adjusted that the angles of incidence and reflection are each of 45°. The complete range of variation of the angles of the positions of the reflecting surface will be of $$\left(45°+\frac{\alpha}{2}\right)-\left(45°-\frac{\alpha}{2}\right)=\alpha$$

So after mounting the reflecting surface 3 with its axis N—S in a direction parallel to the axis of the earth and daily adjusting the same for a reflection of the sunbeams in a direction parallel to the axis N—S, said surface has only to be rotated around this axis N—S with a speed of one revolution per day in order to continuously follow the respective position of the sun and to always reflect the sunbeams in the same direction.

The variation of the direction of the sunbeams reflected by the reflecting surface, due to the horary variations as hereinbefore referred to, may be disregarded and, therefore, no special reference is made thereto.

The reflecting surface 3 may be of any desired contour, for instance, of circular form with a diameter A, in which case, as may be seen at A' and A'', the reflected diameter A will vary between $$A.\sin\left(45°-\frac{\alpha}{2}\right)=0.55A$$

and $$A.\sin\left(45°+\frac{\alpha}{2}\right)=0.83171A$$

whereas the diameter in perpendicular direction is not subject to change.

In accordance with the preceding explanations, the reflecting surface 3, at the one hand, has to revolve with the speed of one revolution in 24 hours around its axis N—S and, at the other hand, once per day has to be adjusted within the range limited by the angle $\alpha$ as referred to. For this purpose, the present invention provides in connection with a reflecting surface a mechanism as shown in Figures 2, 3, 4, and 5.

With reference to Figure 2, the direction of the sunbeams at a day of equinox has been indicated again at I and the reflecting surface 3 may change its position between 3' and 3'', the final positions corresponding to the days of solstice. The reflecting surface is formed by a flat body of any rigid material provided with a polished or mirror-like surface capable of reflecting the sunbeams.

The reflector body 3 is fixedly secured to the rim of a wheel 4 in any suitable known manner. The wheel 4 is carried by a rotative shaft 5 comprising a forked end portion 6 (Fig. 3) carrying a first short shaft 7 on which the afore-mentioned wheel 4 is rotatively together with, but independently from a pinion 8. The forked end portion 6 of the shaft 5 carries a second short shaft 9, on which two toothed wheels 10 and 11 are fixedly mounted, the first one 10 meshing with a toothed segment of the wheel 4, whereas the second one 11 meshes with the pinion 8, the arrangement being such that a movement of the reflector body 3 around its axis of rotation by means of the wheels 4, 10, and 11 is transmitted to the pinion 8. This pinion is provided with a tubular member 12 serving as a control device for the correct adjustment of the reflector body 3 as will be hereinafter explained.

The adjustment of the reflector body 3 between its positions 3' and 3" causes a corresponding rotation of the wheel 4 and this movement, as afore-said, by means of the toothed wheels 10 and 11 is transmitted to the pinion 8. In view of that the tubular member 12 is fixedly secured to said pinion, the adjustment of the position of the reflector body 3 causes a corresponding deviation of said tubular member, so that if a sunbeam passes through the latter, the same indicates the correct adjustment of said reflector body 3. As the reflector body changes its position with regard to the sun with one half of the speed with which the sun changes its position, the control member 12 has to change its position with a speed twice as great as that of the reflector body and for this reason the transmission of the rotation of the wheel 4 to the pinion 8 by means of the toothed wheels 10 and 11 must be in the proportion of 1 : 2.

For effecting the adjustment of the reflector body 3 is provided with a curved member 13 having secured thereto the ends of a rope or the like 14 for moving said curved member and the reflector body in one direction or the other, for which purpose said rope passes around the guide rollers 15, 16, a driving wheel 17 and the guide rollers 16', 15'.

The main shaft 5 has a rear forked end portion 18 provided with a sleeve member 19 fixed by means of a key 20 or the like (Fig. 4). The sleeve member 19 is provided with lugs 21, 22 carrying short shafts 23, 24 for mounting thereon the guide roller 15, 15'. At the free end of the sleeve member 19, a pair of opposite plates 25, 26 form integral parts thereof (Fig. 5). At this end of the sleeve member 19 there are provided two further short shafts 27, 28 for carrying guide rollers 16, 16', whereas near the free ends of the opposite plates 25, 26 a rotative shaft 29 carries fixedly mounted thereon the rope-driving wheel 17 together with a worm wheel 30 meshing with a worm 31. The shaft of this worm 31 is rotatively mounted in suitable lugs (not shown) of one of the plates 25 or 26 and is provided with a cranked handle 32 (Fig. 2) for the operation of the rope-driving wheel 17.

The operation of the cranked handle 32 by means of the rope-driving wheel 17 will cause the rope 14 to pull the curved member 13 in one or the opposite direction so that the reflector body 3 may be readily moved to any position between those indicated by the lines 3' and 3" (Fig. 2). The free end of the curved member 13 conveniently passes through a guide slot 33 of the main shaft 5.

In addition to this adjustment of the reflector body 3, the latter is rotated around its axis N—S by means of the main shaft 5, which for this purpose is rotatively mounted in suitable bearings 34 carried by a pair of supporting members 35 and is provided with a worm wheel 36 meshing with a worm 37. The shaft of this worm 37 carries a further worm wheel 38 in engagement with a worm 39 operated by a motor 40. Instead of this motor a suitable clockwork may be used. The arrangement of the reduction gears 36, 37, 38, 39 is such that the speed of rotation is that of one revolution in 24 hours in order to follow the rotation of the earth around its axis. It will be appreciated that as the daylight time during which the solar energy may be utilized will be in general of ten hours only, the rotating movement of the main shaft 5 and the reflector body 3 during the ten hours per day will never exceed an angle of 180°, for which reason the construction of the device, particularly with regard to the supporting members 35, may be of the simple design as shown in Fig. 2.

It has to be stated that in Fig. 2 the reflector body 3 has been shown in an arbitrary position in as far as its axis of rotation or shaft 5 is concerned. The position of this shaft 5 always has to be parallel to the axis of the earth and will be horizontal if the device is installed at a place of the equator. At any other place the shaft 5 has to form an angle with the horizontal equal to the latitude of said place i. e. for Buenos Aires an angle of approximately 34°36'.

It has to be understood that the construction of the device as hereinbefore described may be modified in the details of the mechanisms of operation and adjustment and that such modifications are to be considered as falling within the scope of the present invention, it being also possible to provide a control member different from the tubular member 12 as shown or to alter the arrangement of the latter.

What I claim as new and desire to secure by Letters Patent is:

1. A sunbeam-receiving and deflecting device for projecting the sunbeams in a direction (N—S) parallel the axis of the earth for the utilization of the solar energy for domestic, industrial or scientific purposes, comprising a plane body provided with a reflecting surface, a rotary support member for fixedly mounting thereon said plane reflector body and for adjusting the position of the latter in one direction, a rotary main shaft arranged in a direction (N—S) parallel to the axis of the earth for adjusting the position of said reflector body and provided with bearing means for mounting said rotary support member, a tube member secured to a rotary pinion member for controlling the adjustment of said reflector body effected by said support member, gearing means provided between said pinion member and said support member for operatively connecting the latter with said control tube member a frame for rotatively supporting said shaft, a first mechanical driving mechanism for rotating said shaft, a second driving mechanism for rotating said reflector body around the axis of its rotary support member, this second driving mechanism including a cranked handle and transmission means arranged between the latter and said reflector body.

2. A sunbeam-receiving and reflecting device according to claim 1, wherein the said first driving mechanism of the rotative shaft comprises an electric motor connected to said shaft by means of reduction gears.

3. A sunbeam-receiving and reflecting device according to claim 1, wherein the said first driving mechanism of the rotative shaft comprises a clock-work operatively connected to the latter.

4. A sunbeam-receiving and reflecting device according to claim 1, wherein the said support member of the plane reflector body is a wheel having at least part of its circumference provided with teeth for cooperation with the said gearing means, and wherein the said main shaft comprises a forked end portion provided with bearings for mounting the shafts of said support member and of said gearing means.

5. A sunbeam-receiving and reflecting device according to claim 1, wherein the said plane reflector body is provided with a curved member and the said cranked handle is operatively connected by means of a rope to said curved member of said reflector body.

6. A sunbeam-receiving and reflecting device according to claim 1, wherein the said second driving mechanism comprises a cranked handle, a rope driving wheel operatively connected to said cranked handle, and guide rollers for a rope connected to a curved member of said reflector body and operated by said rope-driving wheel.

ALEJANDRO POLIANSKY.

References Cited in the file of this patent

UNITED STATES PATENTS

| Number | Name | Date |
|---|---|---|
| 54,118 | Crane et al. | Apr. 24, 1866 |
| 59,438 | Morawetz | Nov. 6, 1866 |
| 497,079 | Severy | May 9, 1893 |
| 507,999 | Davis | Nov. 7, 1893 |
| 683,088 | Wideen | Sept. 24, 1901 |
| 1,479,923 | Moreau | Jan. 8, 1924 |
| 2,135,997 | Arthuys | Nov. 8, 1938 |
| 2,471,954 | Harvey | May 31, 1949 |

FOREIGN PATENTS

| Number | Country | Date |
|---|---|---|
| 326,516 | Germany | Sept. 29, 1920 |